US012107932B2

(12) United States Patent
Maxim et al.

(10) Patent No.: US 12,107,932 B2
(45) Date of Patent: Oct. 1, 2024

(54) SYSTEM AND METHOD FOR TRACKING AND ILLUSTRATING USER ACTIVITY IN A NETWORK ENVIRONMENT

(71) Applicant: Match Group, LLC, Dallas, TX (US)

(72) Inventors: Michael George Maxim, Bronx, NY (US); David F. Koh, Wappingers Falls, NY (US)

(73) Assignee: Match Group, LLC, Dallas, TX (US)

( * ) Notice: Subject to any disclaimer, the term of this patent is extended or adjusted under 35 U.S.C. 154(b) by 0 days.

(21) Appl. No.: 18/128,810

(22) Filed: Mar. 30, 2023

(65) Prior Publication Data

US 2023/0319153 A1 Oct. 5, 2023

Related U.S. Application Data

(63) Continuation of application No. 14/538,983, filed on Nov. 12, 2014, now abandoned.

(51) Int. Cl.
*H04L 67/50* (2022.01)
*G06F 16/957* (2019.01)
*G06F 16/958* (2019.01)
*H04L 67/306* (2022.01)

(52) U.S. Cl.
CPC .......... *H04L 67/535* (2022.05); *G06F 16/957* (2019.01); *G06F 16/958* (2019.01); *H04L 67/306* (2013.01)

(58) Field of Classification Search
CPC . H04L 67/22; G06F 17/3089; G06F 17/30899
See application file for complete search history.

(56) References Cited

U.S. PATENT DOCUMENTS

| 5,696,981 | A  | 12/1997 | Shovers |
| 6,272,467 | B1 | 8/2001  | Durand et al. |
| 7,062,532 | B1 | 6/2006  | Sweat et al. |
| 7,185,355 | B1 | 2/2007  | Ellis et al. |
| 7,342,503 | B1 | 3/2008  | Light et al. |

(Continued)

OTHER PUBLICATIONS

Final Office Action in U.S. Appl. No. 14/538,983 dated Jul. 18, 2019, 25 pages.

(Continued)

*Primary Examiner* — Anh Nguyen
(74) *Attorney, Agent, or Firm* — Patent Capital Group

(57) ABSTRACT

A method is provided in one example embodiment and includes detecting actions taken by users in a computer-implemented matching system and, for each of the detected actions, storing data indicative of the detected action. The method further includes filtering the stored data in accordance with at least one filter selected by an administrator of the computer-implemented matching system and creating a user action log from the filtered stored data. The user action log includes all of the stored data that matches the selected at least one filter. The at least one filter may include log start time, log end time, type of action, user ID, target user ID, and/or site type. The detected action may include viewing another user's profile, changing the user's own profile, sending a message to another user via the computer-implemented matching system, and/or performing a matching search using the computer-implemented matching system.

20 Claims, 16 Drawing Sheets

(56) References Cited

U.S. PATENT DOCUMENTS

| | | |
|---|---|---|
| 7,454,357 B2 | 11/2008 | Buckwalter et al. |
| 7,801,971 B1 | 9/2010 | Amidon et al. |
| 7,966,278 B1 | 6/2011 | Satish |
| 8,005,753 B2 | 8/2011 | Davis |
| 8,135,624 B1 | 3/2012 | Ramalingam et al. |
| 8,140,387 B2 | 3/2012 | Heywood |
| 8,332,418 B1* | 12/2012 | Giordani ............ G06Q 50/01 707/706 |
| 8,458,153 B2 | 6/2013 | Pierce |
| 8,478,757 B2 | 7/2013 | Leibu et al. |
| 8,566,142 B2 | 10/2013 | McCarney et al. |
| 8,782,038 B2 | 7/2014 | Mishra et al. |
| 8,812,519 B1 | 8/2014 | Bent |
| 8,886,645 B2 | 11/2014 | Jones et al. |
| 9,049,259 B2 | 6/2015 | Rathod |
| 9,158,821 B1 | 10/2015 | Quisel et al. |
| 9,165,270 B2 | 10/2015 | Dickinson et al. |
| 9,245,301 B2 | 1/2016 | Klawitter et al. |
| 9,251,220 B2 | 2/2016 | Klawitter et al. |
| 9,253,138 B2 | 2/2016 | Bates et al. |
| 10,831,765 B1 | 11/2020 | Mehr et al. |
| 2002/0040310 A1 | 4/2002 | Lieben et al. |
| 2002/0128885 A1 | 9/2002 | Evans |
| 2003/0144862 A1 | 7/2003 | Smith et al. |
| 2003/0191673 A1 | 10/2003 | Cohen |
| 2004/0128148 A1 | 7/2004 | Austin et al. |
| 2004/0249811 A1 | 12/2004 | Shostack et al. |
| 2005/0021750 A1 | 1/2005 | Abrams |
| 2005/0086211 A1 | 4/2005 | Mayer |
| 2006/0106667 A1 | 5/2006 | Coyne |
| 2006/0173963 A1 | 8/2006 | Roseway et al. |
| 2006/0216680 A1 | 9/2006 | Buckwalter et al. |
| 2007/0073802 A1 | 3/2007 | Terrill et al. |
| 2008/0301557 A1 | 12/2008 | Kotlyar |
| 2009/0164464 A1 | 6/2009 | Carrico et al. |
| 2009/0265326 A1 | 10/2009 | Lehrman et al. |
| 2009/0265430 A1 | 10/2009 | Bechtel et al. |
| 2009/0322597 A1 | 12/2009 | Herrero et al. |
| 2010/0205065 A1 | 8/2010 | Kumar et al. |
| 2010/0246576 A1 | 9/2010 | Bustamente |
| 2010/0283827 A1 | 11/2010 | Bustamente |
| 2010/0285856 A1 | 11/2010 | Thomas |
| 2010/0287286 A1 | 11/2010 | Bustamente |
| 2011/0145039 A1 | 6/2011 | McCarney et al. |
| 2011/0238476 A1 | 9/2011 | Carr et al. |
| 2011/0252340 A1* | 10/2011 | Thomas ............ G06Q 50/01 715/756 |
| 2011/0302583 A1 | 12/2011 | Abadi et al. |
| 2011/0313647 A1 | 12/2011 | Koebler et al. |
| 2012/0166530 A1 | 6/2012 | Tseng et al. |
| 2012/0290979 A1 | 11/2012 | Devecka |
| 2013/0238708 A1 | 9/2013 | Bustamente |
| 2014/0052861 A1 | 2/2014 | Frind et al. |
| 2014/0074602 A1 | 3/2014 | Elsas et al. |
| 2014/0074629 A1 | 3/2014 | Rathod |
| 2014/0129942 A1 | 5/2014 | Rathod |
| 2014/0214711 A1 | 7/2014 | Filstein |
| 2014/0258260 A1* | 9/2014 | Rayborn ............ G06Q 50/10 707/707 |
| 2014/0278869 A1 | 9/2014 | Wagner |
| 2015/0058423 A1* | 2/2015 | Chen ............ H04L 51/212 709/204 |
| 2015/0100422 A1 | 4/2015 | Quisel et al. |
| 2015/0100424 A1 | 4/2015 | Maxim et al. |
| 2015/0142823 A1 | 5/2015 | Klawitter et al. |
| 2015/0142830 A1 | 5/2015 | Klawitter et al. |
| 2015/0142839 A1 | 5/2015 | Ochandio et al. |
| 2015/0169612 A1 | 6/2015 | Kashyap et al. |
| 2016/0155154 A1 | 6/2016 | Klawitter et al. |

OTHER PUBLICATIONS

Final Office Action in U.S. Appl. No. 14/556,712 dated Oct. 5, 2018, 24 pages.
Final Office Action in U.S. Appl. No. 13/722,129 mailed on Feb. 3, 2015.
Final Office Action in U.S. Appl. No. 13/722,129, mailed on Jul. 22, 2016.
Final Office Action in U.S. Appl. No. 14/048,765 mailed on Jun. 3, 2016.
Final Office Action in U.S. Appl. No. 14/084,723 mailed on Aug. 10, 2016.
Final Office Action in U.S. Appl. No. 14/339,983 mailed on May 19, 2016.
Final Office Action in U.S. Appl. No. 14/538,983 dated Jul. 13, 2022, 18 pages.
Non Final Office Action in U.S. Appl. No. 14/538,983 mailed on Jan. 18, 2022, 16 pages.
Non Final Office Action in U.S. Appl. No. 14/538,983 mailed on Mar. 27, 2019, 20 pages.
Non Final Office Action in U.S. Appl. No. 14/556,712 mailed on Mar. 21, 2018, 20 pages.
Non Final Office Action in U.S. Appl. No. 14/556,712 mailed on Mar. 7, 2019, 27 pages.
Non-Final Office Action for U.S. Appl. No. 14/048,765 mailed Nov. 9, 15, 12 pages.
Non-Final Office Action for U.S. Appl. No. 14/339,983 mailed Nov. 6, 2015, 15 pages.
Non-Final Office Action in U.S. Appl. No. 13/722,129 mailed on Oct. 7, 2013.
Non-Final Office Action in U.S. Appl. No. 13/722,129 mailed on Oct. 29, 2014.
Non-Final Office Action in U.S. Appl. No. 14/084,723 mailed Feb. 1, 2016.
Non-Final Office Action in U.S. Appl. No. 14/084,723 mailed Feb. 23, 2017.
Non-Final Office Action issued Apr. 13, 2016, in U.S. Appl. No. 13/722,129, 14 pages.
Notice of Allowance in U.S. Appl. No. 13/722,129 mailed on Apr. 15, 2014.
Notice of Allowance in U.S. Appl. No. 14/084,723 mailed on Jul. 21, 2017.
Notice of Allowance issued in U.S. Appl. No. 14/084,704 mailed Oct. 13, 2015.
Notice of Allowance issued in U.S. Appl. No. 14/084,718 mailed Oct. 7, 2015.
U.S. Patent Application filed with the U.S. Patent and Trademark Office on Dec. 20, 2012 awarded U.S. Appl. No. 13/722,129.
U.S. Appl. No. 14/048,765, filed Oct. 8, 2013.
U.S. Appl. No. 14/339,983, filed Jul. 24, 2014.
U.S. Appl. No. 14/556,712 filed Dec. 1, 2014, 44 pages.
Zoosk Customer Support, "How Do I Video Chat?" available online at Oct. 7, 2011 (3 pages), https://zoosk.zendesk.com/entries/20513017-how-do-i-video-chat.
Offringa, Peter "Zoosk—The Engineering behind Real Time Communications," available online, Aug. 27, 2012 (4 pages), https://highscalability.com/blog/2012/8/27/zoosk-the-engineering-behind-real-time-communications.html.

* cited by examiner

FIG. 2F match.com [SUBSCRIBE]

Welcome lisdfkidsasifhdk    Home Search▽ Matches▽ Connections▽ Messages▽ Profile● Account▽

Find Love. Guaranteed. GO >>    No one can find you until you finish your profile. 📱mobile ✚ invite friends Complete yours now >>

ABOUT ME
ABOUT MY DATE
APPEARANCE <
BACKGROUND/VALUES
LIFESTYLE
IN MY OWN WORDS
-----
PHOTOS

HER APPEARANCE

⚛ SYNAPSE INTELLIGENT MATCHING   Now tell us what you're looking for so we can start selecting compatible matches for you.

UPLOAD PHOTOS   76%

How tall should she be?
From [3]▸ ft. [0]▸ in. To [8]▸ ft. [11]▸ in.   ☑ No Preference

Body type:
☐ Slender    ☐ About average
☐ Athletic and toned    ☐ Heavyset
☐ A few extra pounds    ☐ Stocky
☐ Big and beautiful    ☐ Curvy
☐ full-figured

Eye Color:    ☑ No Preference
☐ Black   ☐ Blue   ☐ Brown
☐ Grey   ☐ Green   ☐ Hazel

Hair Color:    ☑ No Preference
☐ Auburn / Red   ☐ Black   ☐ Dark Brown
☐ Light brown   ☐ Dark Brown   ☐ Salt and pepper
☐ Blonde   ☐ Dark blonde
☐ Silver   ☐ Platinum
☐ Grey
☐ Bald

[SAVE & CONTINUE >>]

FROM FIG. 2H favorite hot spots:
I love Olive Garden (cheap date) LOL then karaoke, pool, things like that I am more into smaller bars then the big ones favorite things:
I love shows like CSI, Las Vegas, Court TV, I love to read true crime novels and SPORTS Ohio State Football is #1 then Nascar I love JR and Stewart last read:
A book by Ann Rule sense of humor: Clever: Nothing's better than a quick-witted comeback, Friendly: I'll laugh at anything sports and exercise: No Answer common interests: Cooking, Dining out, Movies/Videos, Music and concerts, Watching sports

Lifestyle exercise habits: Don't exercise
daily diet: Meat and potatoes
smoke: Daily
drink: Social drinker, maybe one or two
job: Other profession
I am a bartender right now, I used to be a medical secretary but got tired of the 9-5 taking a break
income: $25,001 to $35,000
my place: Live with pets
have kids: Yes, and they live away from home
  how many: 3
want kids: No Answer
pets:
  I have: Dogs, Fish
  I don't have, but like: Cats
  I don't like: Reptiles, Birds, Exotic pets, Gerbils / Guinea Pigs / Etc., Fleas, Other

Background / Values ethnicity: White / Caucasian
faith: Christian / Other
education: Some college
  Ohio State for 2 years

FROM FIG. 2I

| | |
|---|---|
| languages: | English |
| politics: | Conservative |

About My Date

| | |
|---|---|
| hair: | Light brown, Dark brown, Blonde, Bald |
| eyes: | Blue, Green |
| height: | 5' 8" (172.7 cms) to 6' 8" (203.2 cms) |
| body type: | About average, Athletic and toned |
| languages: | English |
| ethnicity: | White / Caucasian |
| faith: | Christian / Other |
| education: | Any |
| job: | Political / Govt / Civil Service / Military |
| income: | Any |
| smoke: | Any |
| drink: | Social drinker, maybe one or two, regularly |
| relationships: | Committed relationships but never married, Widowed, Currently separated, Divorced, Several committed relationships - but now single |
| have kids: | Any |
| want kids: | Don't want to have kids |
| turn-ons: | Skinny dipping, Flirting, Thrills, Public displays of affection, Dancing, Power, Boldness / Assertiveness, Erotica, Candlelight |
| turn-offs: | Body piercings, Long hair, Sarcasm, Brainiacs, Thunderstorms |
| perfect date: | |
| | Fun<br>Boot scootin' across gritty floorboards, the band playing what we'll soon remember as "our song" |

Photos

FIG. 4

| Log Start Time: | Date: 2014-03-28 HH: ☐ MM: ☐ SS: ☐ |
|---|---|
| Log End Time: | Date: 2014-03-29 HH: ☐ MM: ☐ SS: ☐ |
| Preset Log Time Ranges: | ☐ |
| Action: | VIEW_PAGE<br>VIEW_REC<br>SEND_MSG |
| Userid: | candrencil |
| Target Userid: | |
| Site Type: | DESKTOP_SITE<br>MOBILE_SITE<br>MOBILE_APP |
| [Search] | ☐ Auto Refresh<br><br>Enter Refresh Time Period in seconds. Default is 30 seconds |
| [Earlier] | [Later] |

Displaying 25 of 25 userlogs as per filter selected from 03-29-2014 00:00:00 to 03-28-14 00:00:00.

| Time of Log | Action | Action | Target User | Site Type | Metadata |
|---|---|---|---|---|---|
| 3-28-20XX 11:43:45 | VIEW_PAGE | 1037060700 candrencil 32/M/Straight Bronx, New York | 1640483095 | DESKTOP_SITE | {<br>from_rec : 1,<br>stoplight : "green",<br>} |
| 03-28-20XX 11:43:43 | MATCH_SEARCH | 1037060700 candrencil 32/M/Straight Bronx, New York | 0 | DESKTOP_SITE | [Show More]<br>{<br>personality_sports : [ ],<br>order_by : "SPECIAL_BLEND",<br>num_matches : 18,<br>filters : [<... |
| 03-28-20XX 11:43:42 | VIEW_PAGE | 1037060700 candrencil 32/M/Straight Bronx, New York | 4587114586 | DESKTOP_SITE | {<br>from_rec : 2,<br>stoplight : "yellow",<br>} |
| 03-28-20XX 11:42:18 | START_SPOTLIGHT | 1037060700 candrencil 32/M/Straight Bronx, New York | 0 | DESKTOP_SITE | { } |

FIG. 5C

| | | | | | | | |
|---|---|---|---|---|---|---|---|
| Matching Dashboard | | | | | | | |
| Dashboard | | | | | | | |
| Rec Systems ▼ | Overall Statistics | | | | | | |
| Experiments ▼ | Successes 1,963 ^ 0.0% Conversion:4.8% | | | | | | |
| | Contact Info Sends 40,691 v -3.0% Conversion:26.3% | | | | | | |
| | Fourways 154,458 v -0.2% Conversion:15.1% | | | | | | |
| | First Contacts 1,020,477 v -22.6% Conversion:8.4% | | | | | | |
| | Profile Views 12,157,714 v -0.1% Conversion:23.4% | | | | | | |
| | Recommendations 51,972,794 ^ 4.4% Conversion:8.5% | | | | | | |
| | Impressions 612,311,443 v -0.9% | | | | | | |

| | | | | | | |
|---|---|---|---|---|---|---|
| Charts ▼ | | | | | | |
| Search: | | | | | Show 10 ▼ entries | |
| Rec Type ▲ | Impressions per Rec ▲▼ | Views per Rec ▲▼ | First Contacts per View ▲▼ | Fourways per Contact ▲▼ | CI Sends per Fourway ▲▼ | Successes per CI Send ▲▼ |
| ACTIVITY_FEED | 21.9271918 | 0.2266158243 | 0.05122013554 | 0.1775636614 | 0.206879845 | 0.02732240437 |
| AFTER_MESSAGE | 4.999362651 | 0.1249203314 | 0.3163265306 | 0.1451612903 | 0.6666666667 | 0.1666666667 |
| BROADCAST | 0 | 0 | 0 | 0 | 0 | 0 |
| DESKTOP_PUSH | 0 | 0 | 0 | 0 | 0 | 0 |
| FAVORITES | 14.17988436 | 1.268179217 | 0.05218422728 | 0.1195254463 | 0.340445269 | 0.1307901907 |
| HOMEBAR | 11.99467091 | 0.1596318964 | 0.0645501039 | 0.09353716498 | 0.2687270822 | 0.07212475634 |
| INSTANTEVENTS | 0 | 0 | 0.06411892306 | 0.3154228856 | 0.2949526814 | 0.05882352941 |
| LEFTBAR | 2.538413177 | 0.03710903671 | 0.04782365918 | 0.08547567935 | 0.2817764165 | 0.01195652174 |
| LOCALS | 0 | 0 | 0.330068739 | 0.348138592 | 0.2429857067 | 0.02614379085 |
| MATCH_SEARCH | 45.5962217 | 1.015901668 | 0.1183867519 | 0.1201704967 | 0.246746102 | 0.02283974115 |
| Showing 1 to 10 of 25 entries | | | | First Previous 1 2 3 Next Last | | |

SYSTEM AND METHOD FOR TRACKING AND ILLUSTRATING USER ACTIVITY IN A NETWORK ENVIRONMENT

TECHNICAL FIELD

This disclosure relates in general to the field of communications and, more particularly, to a system and a method for tracking and illustrating user activity in a network environment.

BACKGROUND

Communications network architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.).

In the case of an online dating service, for example, an end user will typically be prompted to specify a variety of preferences to be used in matching the end user with other end users in a particular online dating community. The information each end user provides about him or herself may be viewed by other end users in the online community in determining whether to interact with that end user. In certain cases, the actual dating platform can participate in matching activities. This interventionist involvement can often spur or provoke new relationships being formed.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-J are simplified screen shots of an example protocol for participating in an on-line dating service in accordance with one embodiment of the present disclosure;

FIG. 4 illustrates a user action log in accordance with certain aspects of embodiments described herein; and FIGS. 5A-5D illustrate various graphs and charts that may be displayed on a match dashboard user interface in accordance with embodiments of the present disclosure.

DETAILED DESCRIPTION OF EXAMPLE EMBODIMENTS

Overview

A method is provided in one example embodiment and includes detecting actions taken by users in a computer-implemented matching system and, for each of the detected actions, storing data indicative of the detected action. The method further includes filtering the stored data in accordance with at least one filter selected by an administrator of the computer-implemented matching system and creating a user action log from the filtered stored data. The user action log may include all of the stored data that matches the selected at least one filter. In certain embodiments, the storing may include accumulating the data in a disk array. Other embodiments may include transferring the accumulated data from the disk array to an analysis cluster. The method may further include presenting the accumulated data using a presentation type selected by the administrator of the computer-implemented matching system. In certain embodiments, the presentation type is one of a user action log, a pie chart, a list, and a graph. The at least one filter comprises at least one of log start time, log end time, type of action, user ID, target user ID, and site type. The detected action may include at least one of viewing another user's profile, changing the user's own profile, sending a message to another user via the computer-implemented matching system, and performing a matching search using the computer-implemented matching system.

Example Embodiments

Figure 1:
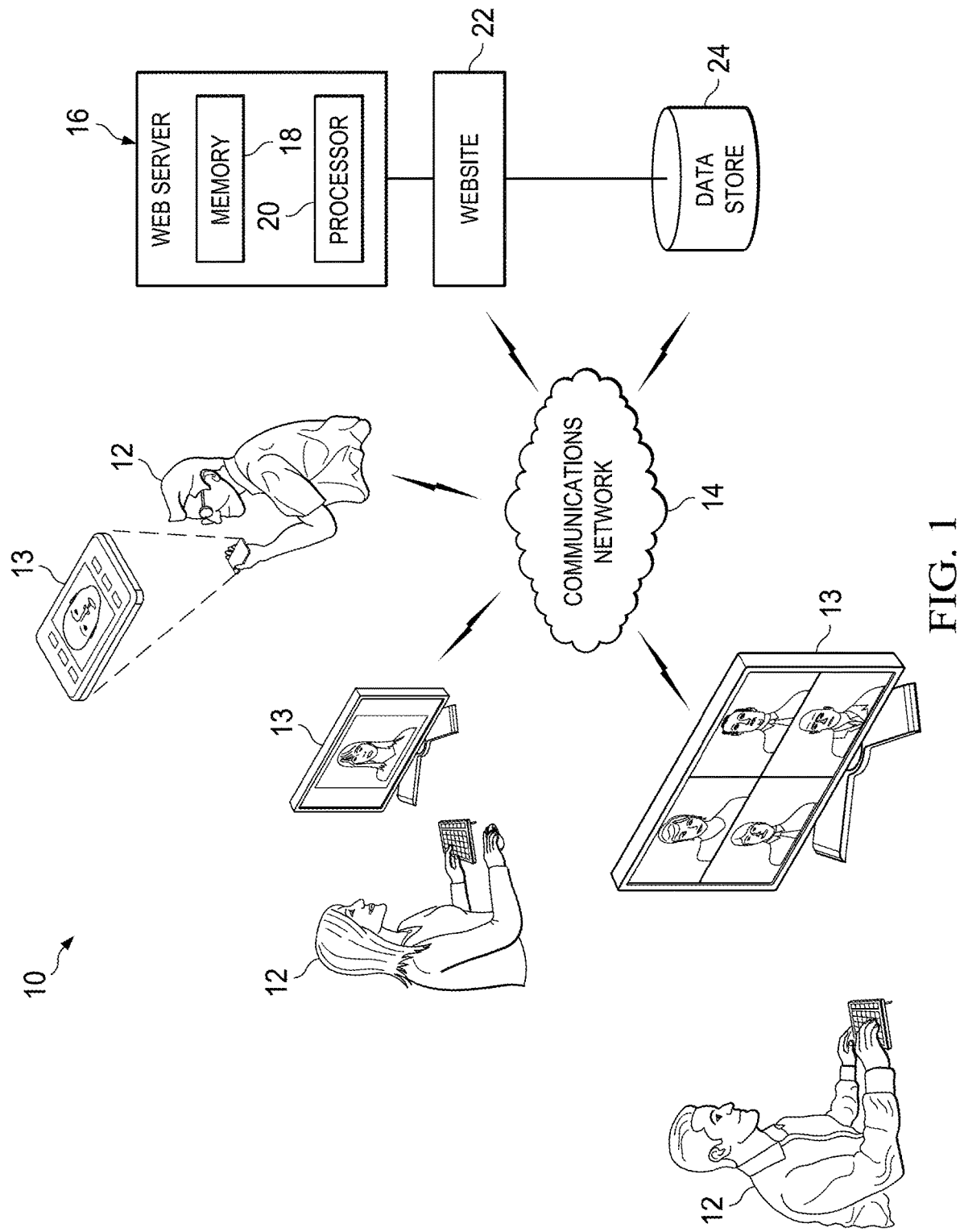
FIG. 1 is a network diagram showing an operating environment of the present disclosure in accordance with one embodiment of the present disclosure.

FIG. 1 is a simplified block diagram of a system 10 for facilitating an online dating scenario in a network environment. In other embodiments in which communications or matching is valuable, system 10 can be leveraged to identify and to evaluate suitable candidates in other areas (e.g., hiring/employment, recruiting, real estate, general person searches, etc.). FIG. 1 includes multiple end users 12 and endpoints 13, a communications network 14, one or more servers, represented in FIG. 1 by a web server 16, each comprising memory 18 and a at least one processor 20, a website 22, and a data store 24. Data store 24 may be any type of mechanism(s) for storing data, including but not limited to one or more files, databases, memory devices, mass storage devices, data centers, disk arrays, etc. System 10, users 12 interact with web server 16 via endpoints 13, each of which comprises an appropriate user interface for interacting with web server 16 via website 22 for facilitating functions and features described herein. In certain example implementations, website 22 and web server 16 are consolidated into a single component, physical structure, equipment, etc.

FIG. 1 may be configured such that inter- and intra-communications are readily achieved by any of the components included therein. The present disclosure is capable of providing both an online component (as illustrated in FIG. 1) and an off-line component such that one or more end users can meet, gather information, resolve to meet, and then subsequently meet in person with the assistance of system 10. Ancillary components to such a comprehensive process may involve pre-date profiles, post-date follow-ups, and a myriad of other significant features, some of which are outlined in detail below.

End users 12 may include a variety of types of end users, such as clients, customers, prospective customers, or entities wishing to participate in an online dating scenario and/or to view information associated with other participants in the system. End users 12 may also seek to access or to initiate communications with other end users that may be delivered via communications network 14. End users 12 may review data (such as user profiles, for example) associated with other users in order to make matching decisions or selections. Data, as used herein in this document, refers to any type of numeric, voice, video, or script data, or any other suitable information in any appropriate format that may be communicated from one point to another.

End users 12 may access the aforementioned data via endpoints 13, which may be inclusive of devices used to initiate a communication. Note that the broad term "user" encompasses any type of node or user device, or any type of endpoint discussed herein. Additionally, the term "user" can further include any type of profile to be used in the system discussed herein. Hence, the term "user" can include (but is not limited to) elements such as a computer, a personal digital assistant (PDA), a laptop or electronic notebook, a cellular telephone, an IP telephone, an iPhone™, an iPad™, a Microsoft Surface™, an Android™ phone, a Google Nexus™, or any other device, component, element, or object capable of initiating voice, audio, or data exchanges within communication system 10. The endpoints may be inclusive of a suitable interface to the end user 12, such as a microphone, a display, or a keyboard or other terminal equipment. Endpoints 13 may also include any device that seeks to initiate a communication on behalf of another entity or element, such as a program, a database, or any other component, device, element, or object capable of initiating a voice or a data exchange within communication system 10. In addition, each of the endpoints 13 may be a unique element designed specifically for communications involving system 10. Such an element may be fabricated or produced specifically for matching applications involving end user 12 and endpoint 13.

A user may employ any device capable of operating as an endpoint 13 to connect to communications network 14 via wire, wireless, cellular, satellite link or other suitable interfaces. Web server 16, which as previously noted includes memory 18 and at least one processor 20, hosts website 22 and has access to transmit and receive user or presence data (e.g., user profile data, user and/or user endpoint data, user contact data) from database 24. Presence data may be collected, aggregated, and utilized as required to facilitate communications between endpoints 12 over communications network 10 or other outside communication systems. Presence data may also include information and/or instructions enabling the creation, duration, and termination of communication sessions between diverse endpoints 13 that utilize different communication and/or networking protocols.

Communications network 14 is a communicative platform operable to exchange data or information emanating from endpoints 13. Communications network 14 represents an Internet architecture in a particular embodiment of the present disclosure, which provides end users 12 with the ability to electronically execute or to initiate actions associated with finding a potential match candidate. Alternatively, communications network 14 could be a plain old telephone system (POTS), which end user 12 could use to perform the same operations or functions. Such transactions may be assisted by management associated with website 22 or manually keyed into a telephone or other suitable electronic equipment. In other embodiments, communications network 14 could be any packet data network (PDN) offering a communications interface or exchange between any two nodes in system 10. Communications network 14 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

In one embodiment, web server 16 comprises a server that is operable to receive and to communicate information to one or more end users 12. In a generic sense, web server 16 can implement a computer-implemented matching system that provides a framework for suitable matching activities. Alternatively, web server 16 may be any switch, router, gateway, cache, server blade, software, processor, proprietary component, object, module, or element (or any combination of these) operable to facilitate communications involving end user 12. Web server 16 may be integrated with database 24 and/or website 22, where any one or more of these elements may share or otherwise coordinate the activities discussed herein.

In one particular embodiment, web server 16, via interaction with database 24 and/or in conjunction with website 22, is engaged in facilitating interaction(s) between parties interested in seeking a romantic partner (i.e., online dating). For example, website 22 can be online dating service provider www.Match.com, www.Chemistry.com, www.okcupid.com, or any other suitable provider. In certain example scenarios, a given end user may pay a fee for a subscription-based service (and potentially, only those users would qualify to be eligible to participate in events in certain example implementations, although other example embodiments involve non-members being eligible for participation). Additionally, certain end user fee structures may apply to different tiers of service: some of which may entitle an end user to enhanced features on website 22 (e.g., the ability to communicate more frequently with other users, additional matches being provided (potentially, more frequently) to an end user who paid the higher fee structure, the ability to store data, the ability to share data, the ability to upload additional information, the ability to target specific searches based on particular criteria, the ability to receive preferential positioning in the context of being matched to other users, the ability to perform video calls (e.g., Skype, etc.) with other users, the ability to perform audio calls with other users, etc.).

In certain embodiments, website 22 is a computer-implemented matching system, which may be any website or architecture provided for facilitating a connection involving two or more people, and which may make use of a given profile, photograph, resume, article description, etc. This could include services associated with job placements, escort services, auction services, social media, real estate listings, recruiting services (e.g., in athletics, academia, employment scenarios, instances involving the sales of goods and services), etc.

Considerable flexibility is provided by the structure of web server 16 and website 22 in the context of system 10. Thus, it can be easily appreciated that such functions could be provided external to web server 16 or website 22. In such cases, such a functionality could be readily embodied in a separate component, server, processor, device, or module. Note that these online dating features and capabilities may be provided in just one of these elements, in both, or distributed across both of them. Hence, in certain embodiments, the online dating operations may be consolidated in a single website, where no redirection is needed, nor performed for the user.

In operation of an example embodiment, consider a case where a given end user is interested in participating in an online dating scenario. End user 12 can access website 22 via the communications network 14 (which in the example presented comprises the Internet) using endpoint 13, register, and create a profile on the site. Moreover, end user 12 can access website 22 through any suitable banner, pop-up, partnership, e-mail solicitations, direct mailings, etc. It can be appreciated that online commerce can be generated by a plethora of marketing tools and any such tools can readily cooperate with the operations of the present disclosure.

At this point, matching of any form can commence amongst the members of the online community. For example, in the context of a romantic endeavor, a person may begin the dating process or engage in communications that would spawn such dating. Other applications could include job applicants who are being sought by employers. Any of the individuals who reside in the online community can begin using any of the tools or capabilities of the platform.

FIGS. 2A-2J illustrate example screen shots that may be provided in the online dating process to facilitate presentation of information to and gathering of information from member end users. FIGS. 2A-2J are presented herein for purposes of discussion. It is imperative to note that these illustrations are only being provided to further outline a particular implementation of the present disclosure. In no way should these diagrams be used to limit or to restrict the broad teachings of the present disclosure. Such illustrative information has been offered earnestly and, thus, should not be construed to confine the broad applications of the present disclosure.

Figure 2A:
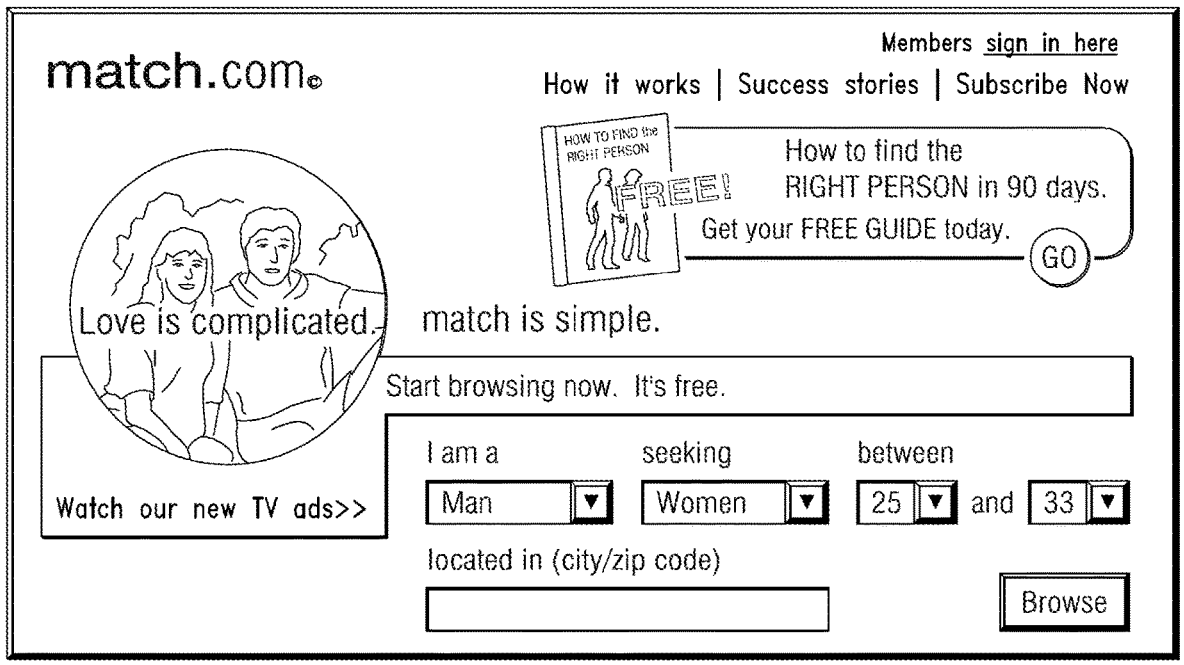
Figure 2B:
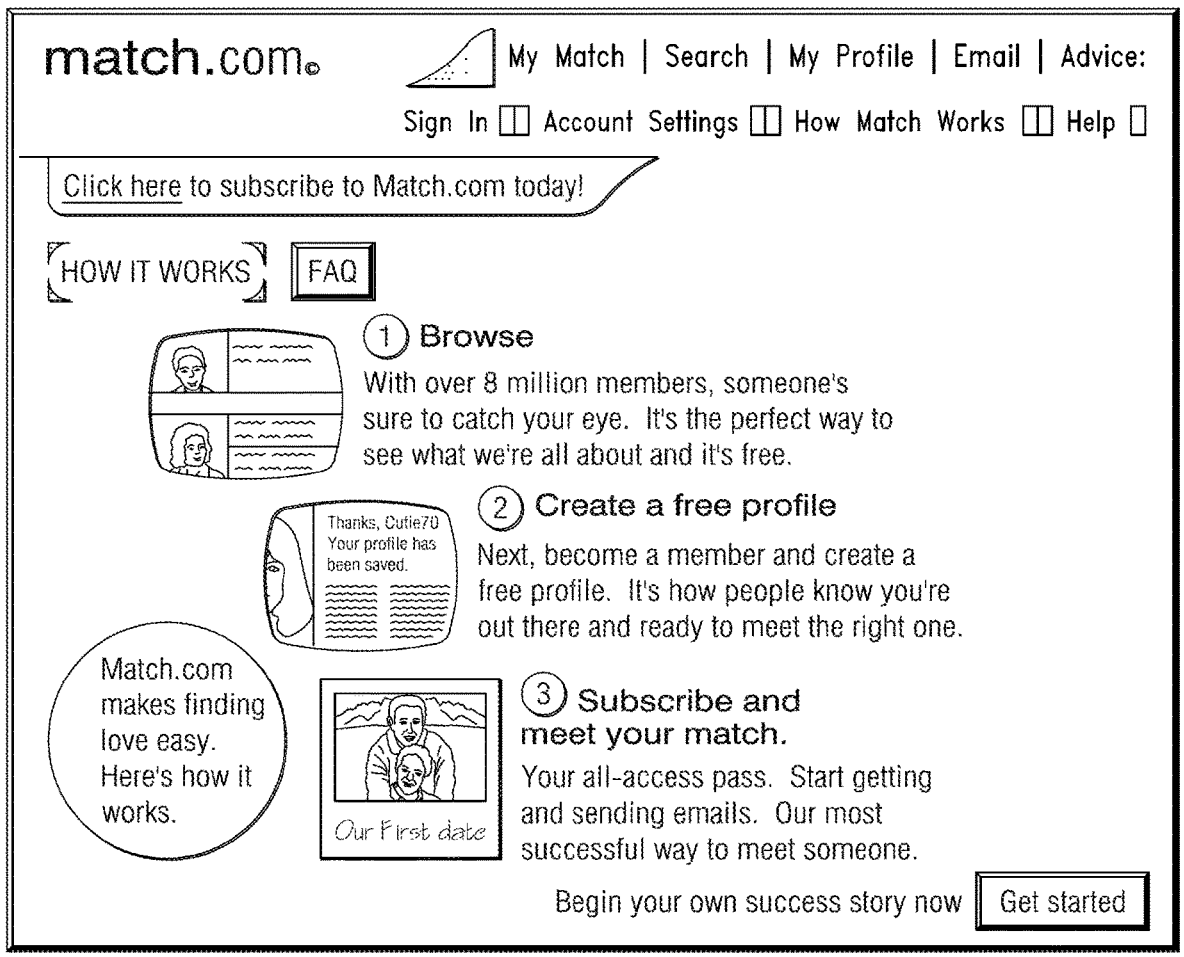

FIG. 2A is an example screen shot of a home page from which an interested end user may begin his/her journey. In the illustrated example, the home page solicits location information, such as a city or zip code, as well as an indication of the end user's gender and an age range and gender preference of persons the end user is interested in "meeting" via system 10. Subsequent to the end user's completion of the requested information and clicking on a "How it Works" icon on the home page of FIG. 2A, a screen shot as shown in FIG. 2B is presented to the end user. The screen shot of FIG. 2B provides a generic outline of the online dating process. As outlined in the screen shot of FIG. 2B, as a first step, an end user may choose to browse the website to view pictures of members along with summaries of the members' profiles. After browsing the website, the end user may decide to create a free profile. Once the end user browses the website and creates a profile, the end user may opt to subscribe to the service and receive information from/about others who are part of the online community. For purposes of example and ease of explanation, it will be assumed for the remainder of the discussion of FIGS. 2A-2D that the potential new end user investigating and ultimately subscribing to the service is a male named "Tom" who is interested in finding a female match.

Figure 2C:
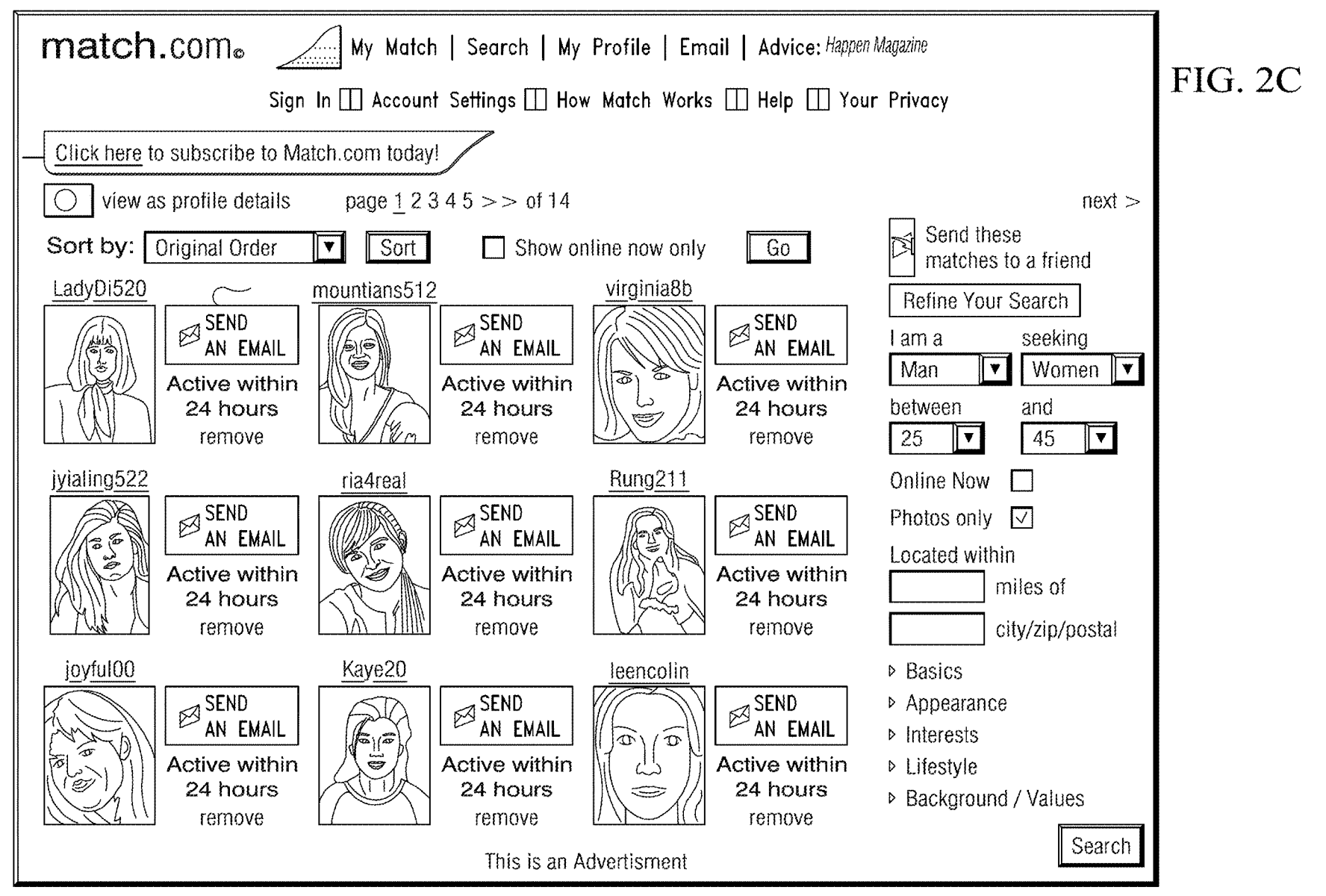
Figure 2D:
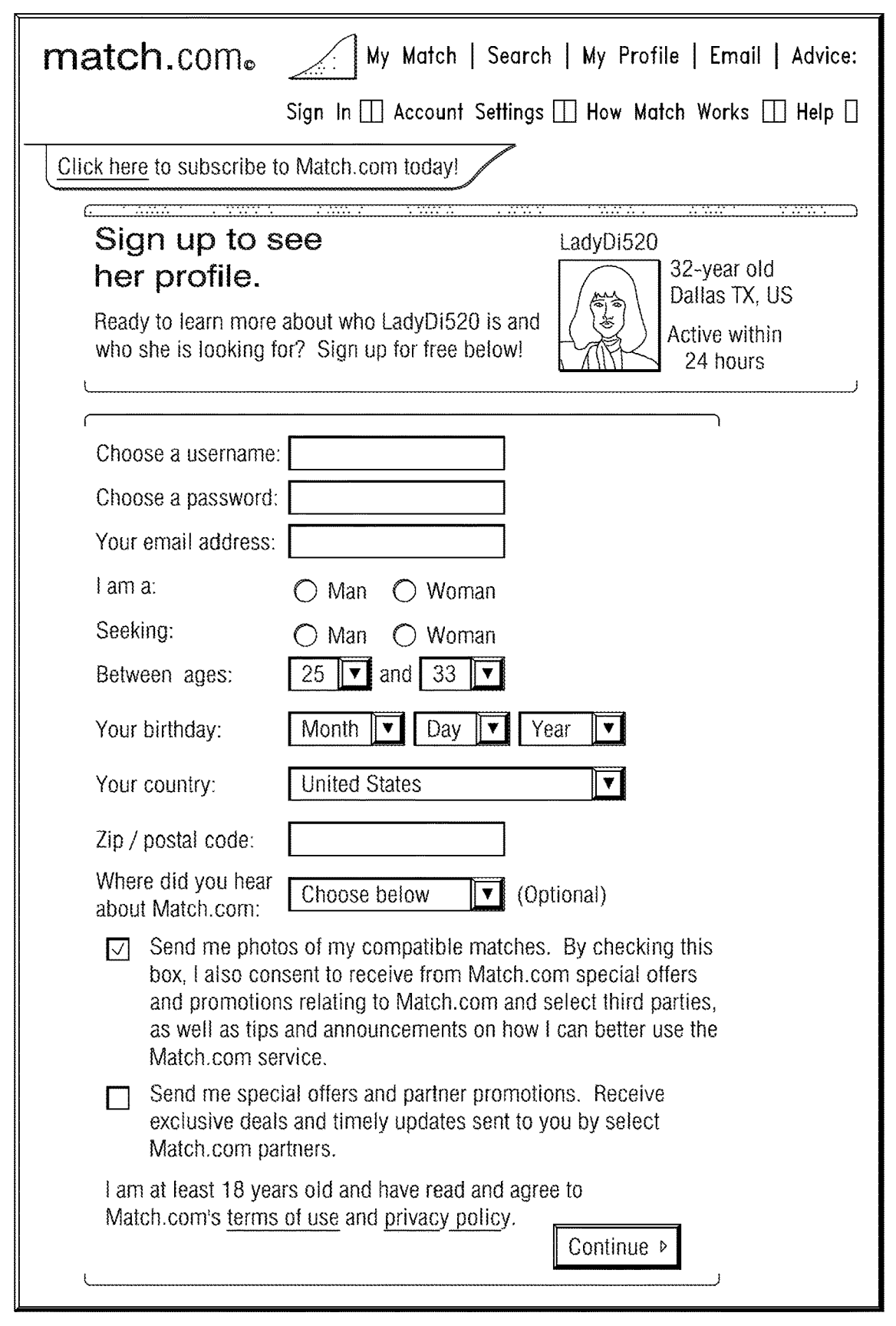

FIG. 2C is an example screen shot of a number of profiles that may be viewed by Tom during the browsing phase described above. In the context of this shot, Tom may be simply browsing. Assuming Tom has decided he would like to know more about one of the members whose profile is presented in FIG. 2C, he may click on the picture associated with the selected profile. For example, assuming Tom has decided he would like more information about "LadyDi520", clicking on her picture results in his being directed to a web page as shown in FIG. 2D, where he is solicited to sign up for the online dating subscription such that he can effectively contact his candidate selection. It will be noted that the information solicited using the page shown in FIG. 2C may be used in selecting matches for Tom. The information may also be displayed on Tom's profile or summary thereof presented to other users to assist those users in determining whether they are interested in interacting with him.

Figure 2E:
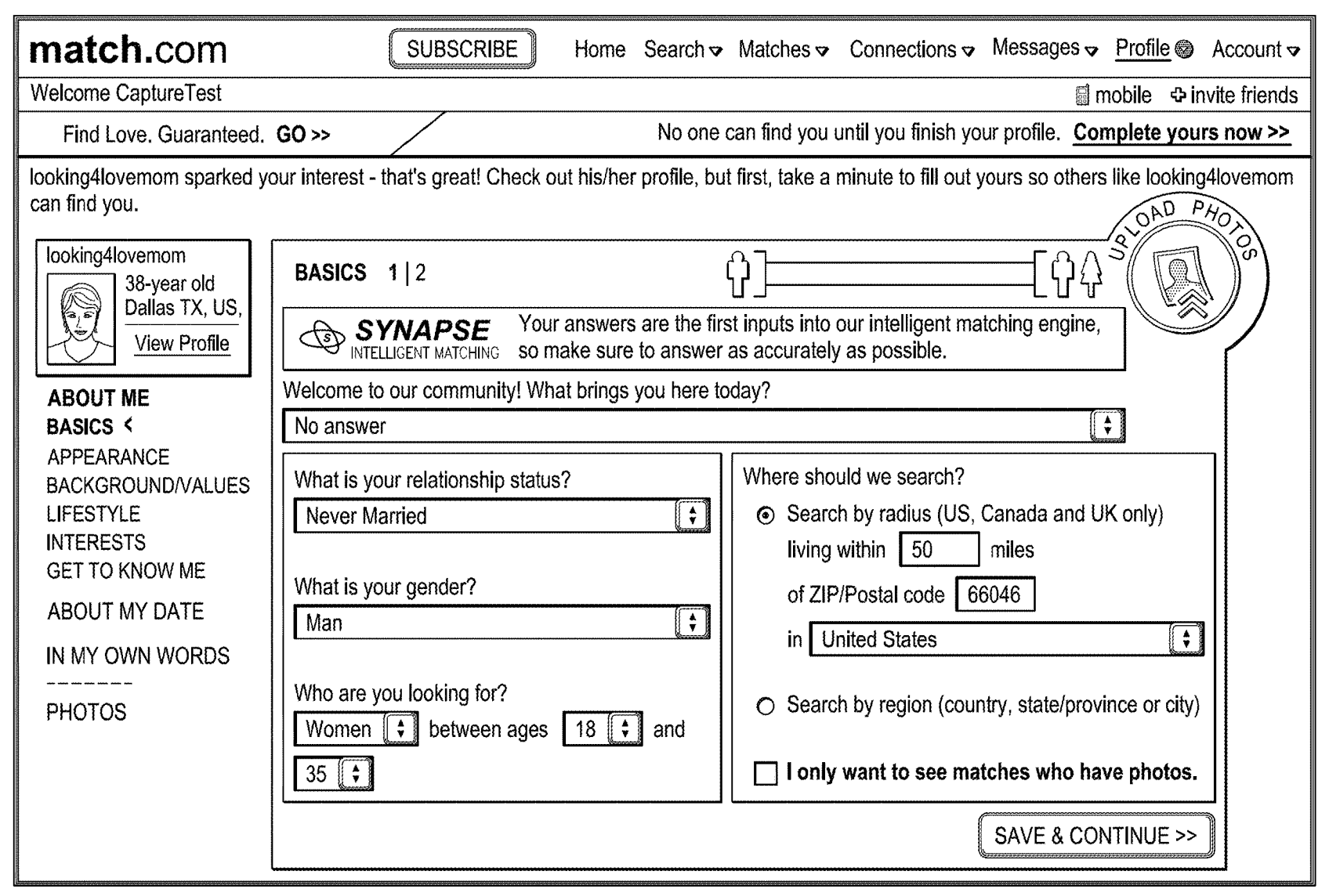
Figure 2G:
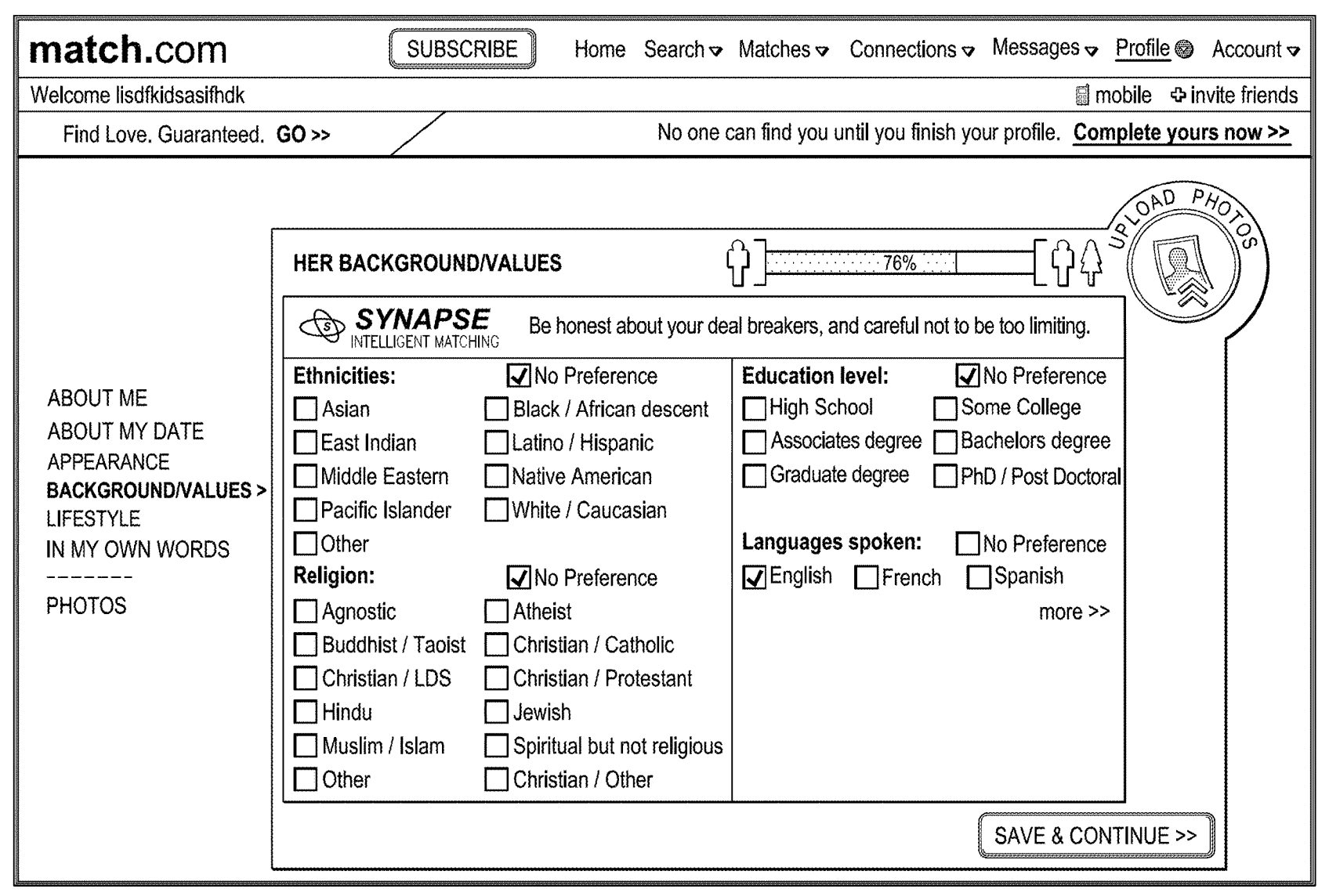

FIGS. 2E-2G illustrate various screen shots comprising a user information collection process in accordance with one embodiment. Using the web pages illustrated in FIGS. 2E-2G, system 10 collects a variety of information from an end user, including, but not limited to, basic information about the end user (FIG. 2E), as well as information about the type person the end user would be interested in dating, including information about a potential date's physical appearance (FIG. 2F) and background and values (FIG. 2G). It will be recognized that the information collected using the web pages illustrated in FIGS. 2E-2G is illustrative only and that any type/amount of information may be solicited in the illustrated manner.

Figure 2H:
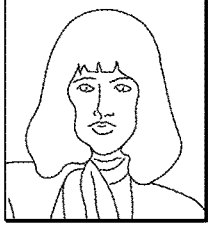

FIGS. 2H-2J are example screen shots of the full profile of LadyDi520, the picture Tom selected while browsing. In illustrated profile, LadyDi520's match criteria are displayed, as well as other information that may be pertinent to a potential mate. Any suitable items can be provided in such a profile (such as interests, favorite hot spots, favorite things, desire for children, background, etc.). Virtually any type or format of information (inclusive of video and audio data) may be provided in such a profile. In particular, the profile includes information that was solicited from LadyDi520 when she set up her online dating account. The profile may include a photo, biographical information (e.g., gender, age, location, relationship status, etc.), physical information (e.g., height, weight, hair and eye color, etc.), interests (e.g., hobbies, "favorites," etc.), lifestyle information (e.g., exercise habits, employment, smoking/drinking habits, etc.), and background/values (e.g., ethnicity, faith, education, etc.). The profile may also include a section entitled "About My Date," in which the end user specifies preferences about the type of person he/she would like to meet/date (e.g., appearance, interests, faith, education, relationship goals, etc.). In some embodiments, a full profile, including the profile information provided by the end user and stored in the system, is displayed to interested viewers; in other embodiments, only a summary or subset of the profile information is displayed.

In certain embodiments, it may be useful a provider of an online dating service, such as that illustrated in FIG. 1, to evaluate user actions, including, for example searches performed by each user, messaging conducted between users, and profile changes for each user, to determine what is leading to interaction via the service between users. For example, an interaction between first and second users may be initiated by the first user performing a match search and viewing the profile of and/or messaging the second user, who is presented in the results of the search. Alternatively, an interaction between first and second users may be initiated by the first user's selecting the second user from the first user's "daily matches." Still further, an interaction between first and second users may result from the second user being presented to the first user as a "similar user" to other users in which the first user has expressed interest. It will be recognized that it would be useful for the provider of the online dating system to be able to track how each user pair "met" and aggregate this data for use in evaluating the effectiveness of different "introduction methods" employed by the online dating system.

Another aspect of determining the effectiveness of different introduction methods is to determine the effect of the introduction. For example, if the first user sends a message to the second user and the second user never responds, the introduction is likely not a quality introduction. In contrast, if the first user's message results in an ongoing exchange of messages between the first and second users (e.g., such as a two-way message or a four-way message), the introduction is more likely to be viewed as a quality introduction. As used herein, a quality introduction, or message thread, is a message thread that strengthens relationships between a pair of users, engages a pair of users, etc. In contrast, a "low value" introduction or message thread is one that does not strengthen relationships between a pair of users, engage each user of the pair of users, etc.

In some embodiments, all statistics among pairs of users are aggregated and may be reviewed and/or evaluated by an administrator of the system. Such evaluation may be useful in determining the effectiveness of various aspects and/or features of the system. The statistics may be displayed in graphical format or in text format, such as a list. In other embodiments, a streaming interface that displays the various statistics by user or by feature, for example, may be provided to enable real-time analysis by an administrator.

Figure 3:
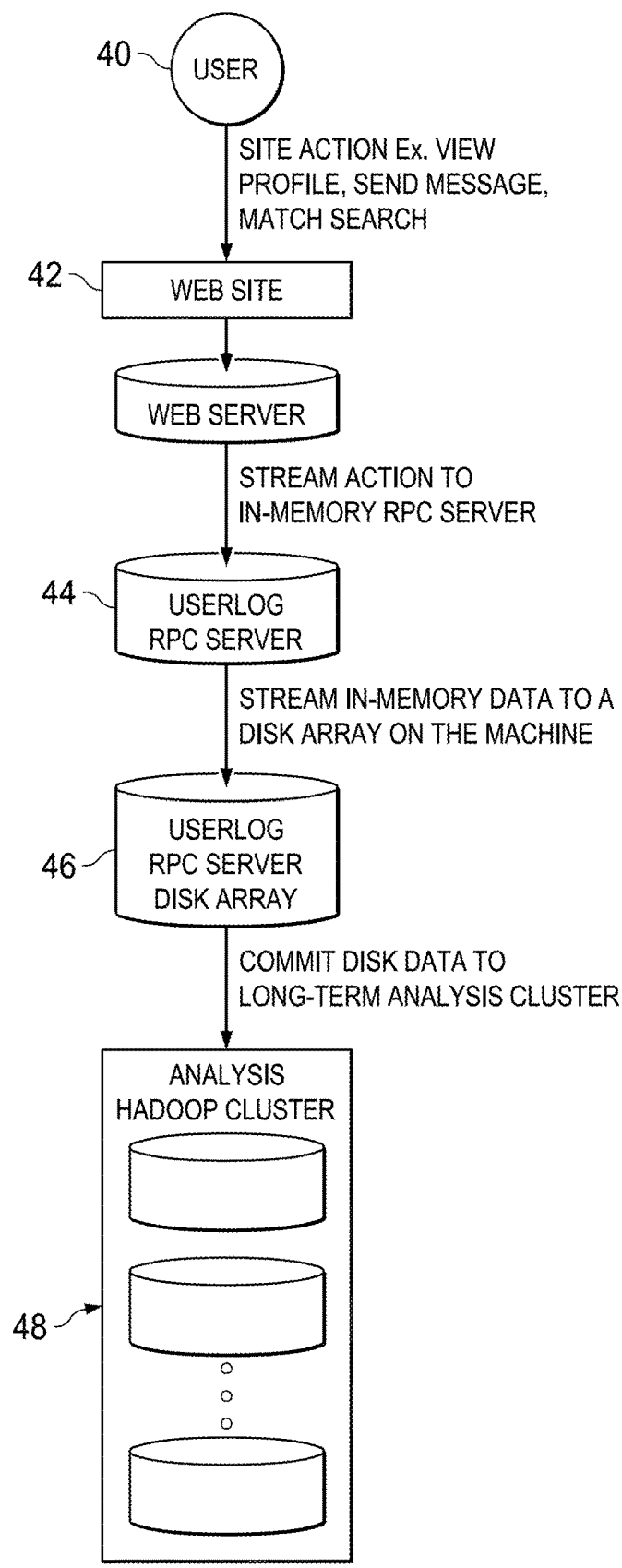
FIG. 3 illustrates a block diagram of an embodiment of a system for implementing a user action log in connection with an online dating service in accordance with embodiments of the present disclosure.

FIG. 3 illustrates a block diagram of an embodiment of a system for implementing a user action log in connection with an online dating service, for example. As shown in FIG. 3, a user 40 interacts with a website 42 comprising an interface of an online service, which in some embodiments may be an online dating service, to interact with other users of the service. In accordance with features described herein, all actions performed by user 40 in connection with the web site 42 are captured by a web server 44 that hosts the web site 42. As used herein, "actions" may include user 40 viewing another user's profile, changing his or her own profile, sending a message to another user via the website (e.g., via instant messaging, email, or other types of messaging services provided by the website), performing a match search that results in another user's profile being displayed, viewing another user's profile, etc. For each detected action, data documenting the action is streamed to a server 44, which in some embodiments may be an in-memory Remote Procedure Call ("RPC") server. Server 44 streams in-memory data to a disk array 46 that may reside on server 44. After a certain period of time, the accumulated data may be committed to a long term analysis cluster 48, which may be implemented as a Hadoop cluster. From the cluster 48 aggregated data may be accessed, parsed, filtered, and analyzed in various ways to analyze various features of the online service.

FIG. 4 illustrates a user action log in accordance with certain aspects of embodiments described herein. User action log is populated with data from analysis cluster 48 (FIG. 3) filtered in accordance with various filters selected by an administrator, such as log start time, log end time, type of action (e.g., view page, view recommendation, send message, etc.), user ID (which identifies the user performing the actions), target user ID (which identifies the target of the actions), and site type (e.g., desktop, mobile site, mobile app). Once the filters are selected, the actions corresponding to the selected filter(s) are displayed, e.g., in chronological order (although it will be recognized that other ordering method may be selected and employed). The user log stream interface allows service administrators to determine which actions by a user may have led to the user's positive interaction with another user. For example, if two users leave the service, citing the fact that they are in a relationship with the other user as their reason for termination of the service, it may be beneficial to search recent actions of each of the users to determine what sequence of actions led to their relationship "success". Conversely, if a user complains that he or she has had a less than favorable experience using the service, it would be helpful to be able to track his or her recent actions to attempt to determine why that was the case.

Figure 5A:
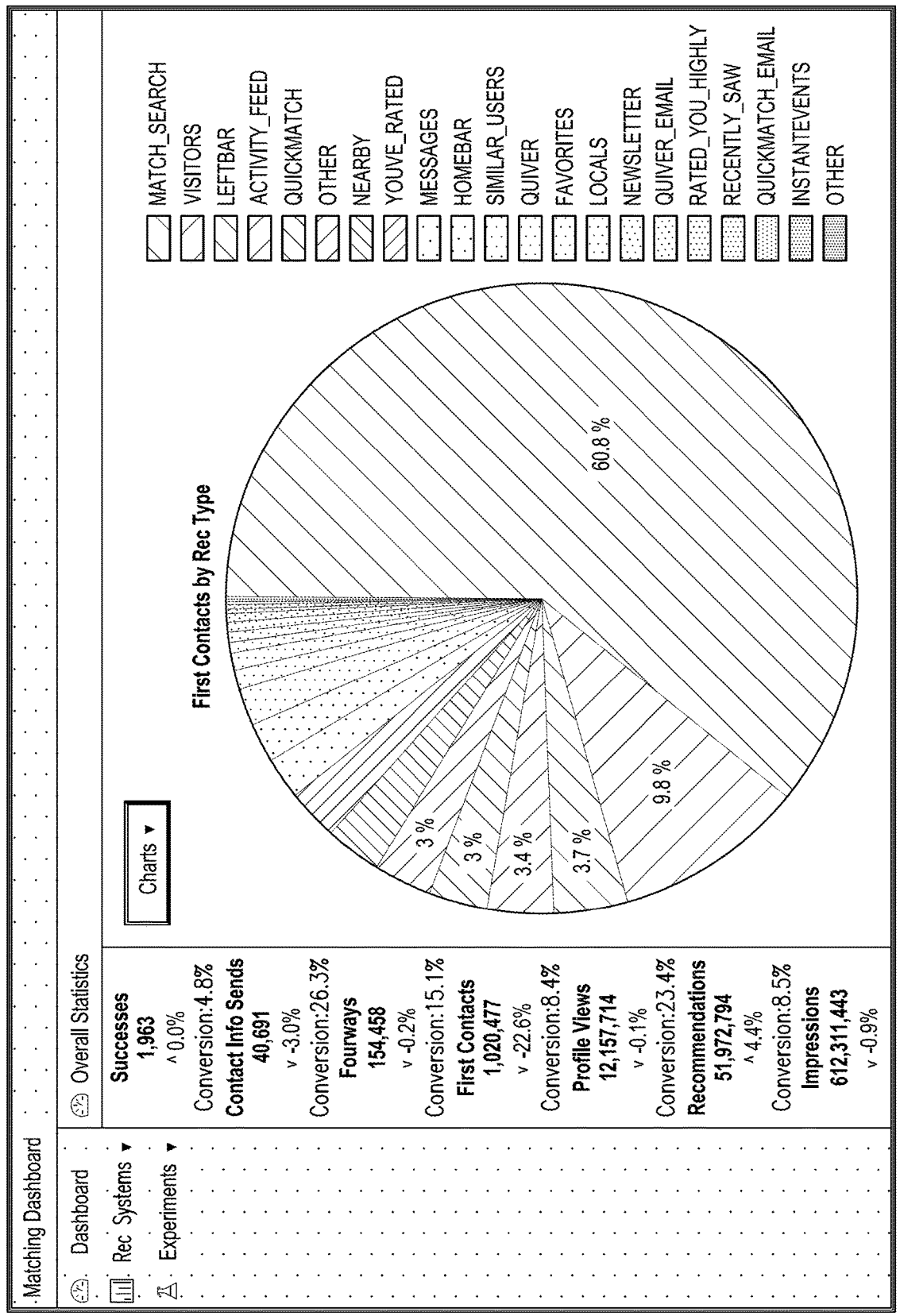

FIGS. 5A-5D illustrate various ways in which aggregated user action data may be displayed. FIG. 5A illustrates a matching dashboard display of a user interface in accordance with one embodiment on which a pie chart illustrating first contacts by recommendation type is displayed. A list along the left side of the matching dashboard lists totals for each of a variety of criteria over a period of time, which in one embodiment is the previous day. In certain embodiments, totals are listed for all users.

Figure 5B:
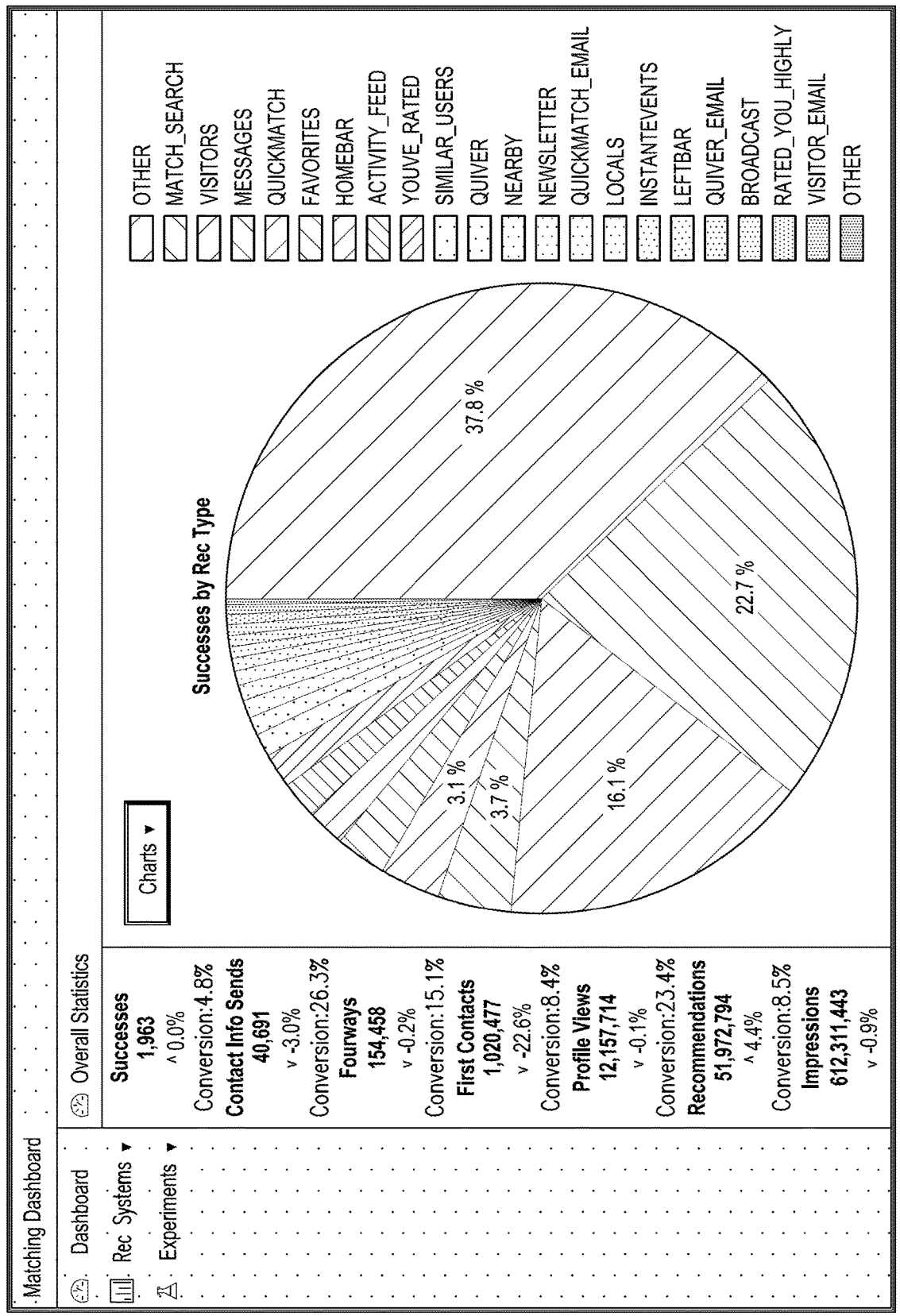
Figure 5D:
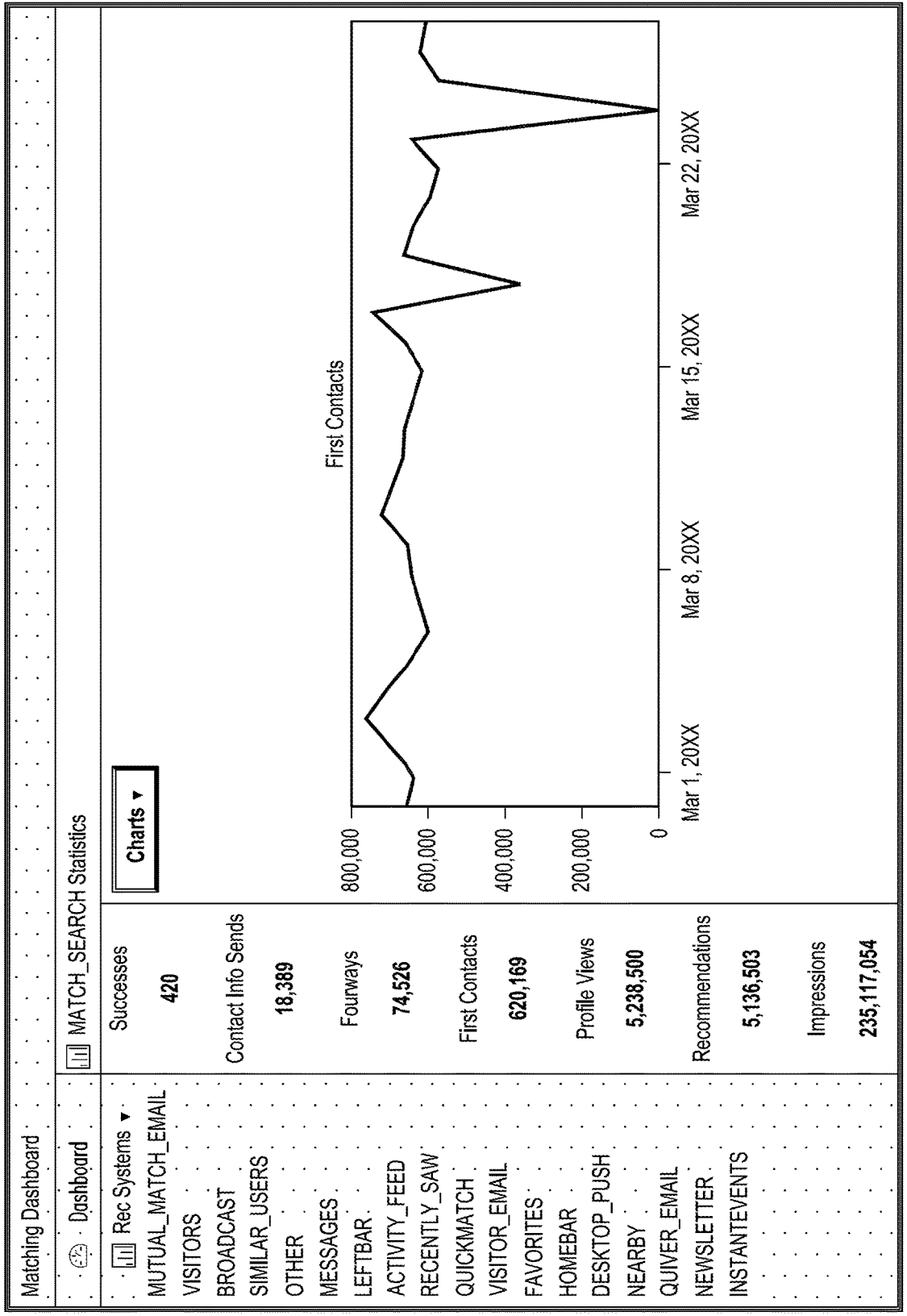

FIG. 5B illustrates a matching dashboard display of a user interface in accordance with one embodiment on which a pie chart illustrating successes by recommendation type is displayed. In certain embodiments, a "success" is defined as two users disabling their respective accounts and indicating that the other user is the reason they are disabling their account (i.e., the two users have presumably entered into a relationship with one another as a result of the system). FIG. 5C illustrates a matching dashboard display of a user interface in accordance with one embodiment on which a chart illustrating various statistics by recommendation type is displayed. For example, the chart shown in FIG. 5C indicates, for each recommendation type, impressions per recommendation, views per recommendation, first contacts per view, four-ways per contact, CI sends per four-way, and successes per contact information, or "CI," send. In certain embodiments, a CI send indicates that two users have exchanged contact information (e.g., phone number, email address). FIG. 5D illustrates a matching dashboard display of a user interface in accordance with one embodiment showing an x-y graph of the number of first contacts over a selected time period.

All of the data provided by the user action log feature may be utilized as desired by the service administrator to improve aspects features of the service.

Although the present disclosure has been described in detail with reference to particular embodiments, it should be understood that various other changes, substitutions, and alterations may be made hereto without departing from the spirit and scope of the present disclosure. For example, although the present disclosure has been described with reference to a dating protocol, any service that deals with (or that leverages) profiles, photos, resumes, user information more generally, etc. could readily benefit from the present disclosure.

Moreover, although the present disclosure has been described with reference to a number of elements included within system 10, these elements may be rearranged or positioned in any appropriate manner to accommodate any suitable networking configurations. In addition, any of the elements of FIG. 1 may be provided as separate external components to system 10 or to each other where appropriate.

It should also be noted that any of the question portions of the platform can leverage any type of format. Thus, in any aspect of the online dating process described herein, such as establishing a personality profile, for example, any suitable question format can be employed. Example formats include a Yes/No format, a multiple choice question format, a short answer format, a true/false format, etc. Other formats can readily be used in order to achieve the desired responses and solicit the appropriate data.

Note that in certain example implementations, the matching functions outlined herein, such as those carried out by web server 16 and/or provided as an application for an endpoint being operated by an end user (e.g., a mobile application for an iPhone™), may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory, as shown in FIG. 1, can store data used for the operations described herein. This includes the memory being able to store software, logic, code, or processor instructions that are executed to carry out the activities described in this Specification.

A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

These devices illustrated herein may maintain information in any suitable memory (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of more than one network element. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to myriad other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure. Although the present disclosure has been described in detail with reference to particular arrangements and configurations, these example configurations and arrangements may be changed significantly without departing from the scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   creating a first profile for a user in an online dating service;
   providing, to the user, a view of a second profile, the second profile including a photo and being of another user in the online dating service;
   soliciting the user to pay a fee for the online dating service;
   permitting the user to receive preferential positioning in the context of being matched to the other user, at least in part based on the fee;
   delivering a communication with the other user's profile; and
   permitting the user to communicate more frequently with the other user, at least in part based on the fee.

2. The method of claim 1, further comprising:
   delivering a message to the other user via the online dating service.

3. The method of claim 1, wherein the online dating service includes a subscription-based service.

4. The method of claim 1, further comprising:
   providing an additional match to the user, at least in part based on the fee.

5. The method of claim 1, further comprising:
   permitting the user to target a search based on a criterion, at least in part based on the fee.

6. The method of claim 1, wherein the permitting the user to communicate more frequently relates to an exchange of messages between the user and the other user.

7. The method of claim 1, wherein the communication is a call sent via the online dating service.

8. A non-transitory medium that includes code for execution and that, when executed by a processor, is operable to perform operations comprising:
   creating a first profile for a user in an online dating service;
   providing, to the user, a view of a second profile, the second profile including a photo and being of another user in the online dating service;
   soliciting the user to pay a fee for the online dating service;
   permitting the user to receive preferential positioning in the context of being matched to the other user, at least in part based on the fee;
   delivering a communication with the other user's profile; and permitting the user to communicate more frequently with the other user, at least in part based on the fee.

9. The medium of claim 8, the operations further comprising:
   delivering a message to the other user via the online dating service.

10. The medium of claim 8, wherein the online dating service includes a subscription-based service.

11. The medium of claim 8, the operations further comprising:
   providing an additional match to the user, at least in part based on the fee.

12. The medium of claim 8, the operations further comprising:
   permitting the user to target a search based on a criterion, at least in part based on the fee.

13. The medium of claim 8, wherein the permitting the user to communicate more frequently relates to an exchange of messages between the user and the other user.

14. The medium of claim 8, wherein the communication is a call sent via the online dating service.

15. An apparatus, comprising:
   a processor; and
   a memory, wherein
   the apparatus is configured to
      create a first profile for a user in an online dating service;
      provide, to the user, a view of a second profile, the second profile including a photo and being of another user in the online dating service;
      solicit the user to pay a fee for the online dating service;
      permit the user to receive preferential positioning in the context of being matched to the other user, at least in part based on the fee;
      deliver a communication with the other user's profile; and
      permit the user to communicate more frequently with the other user, at least in part based on the fee.

16. The apparatus of claim 15, wherein the apparatus further is configured to deliver a message to another user via the online dating service.

17. The apparatus of claim 15, wherein the apparatus further is configured to provide an additional match to the user, at least in part based on the fee.

18. The apparatus of claim 15, wherein the apparatus further is configured to permit the user to target a search based on a criterion, at least in part based on the fee.

19. The apparatus of claim 15, wherein to permit the user to communicate more frequently relates to an exchange of messages between the user and the other user.

20. The apparatus of claim 15, wherein the communication is a call sent via the online dating service.

* * * * *